3,440,910
UNIVERSAL SHEAR
Harry E. Scribner, 18600 Glenwood Lane,
Brookfield, Wis. 53005
Filed Mar. 23, 1967, Ser. No. 625,426
Int. Cl. B26d 7/06, 5/16
U.S. Cl. 83—94        10 Claims

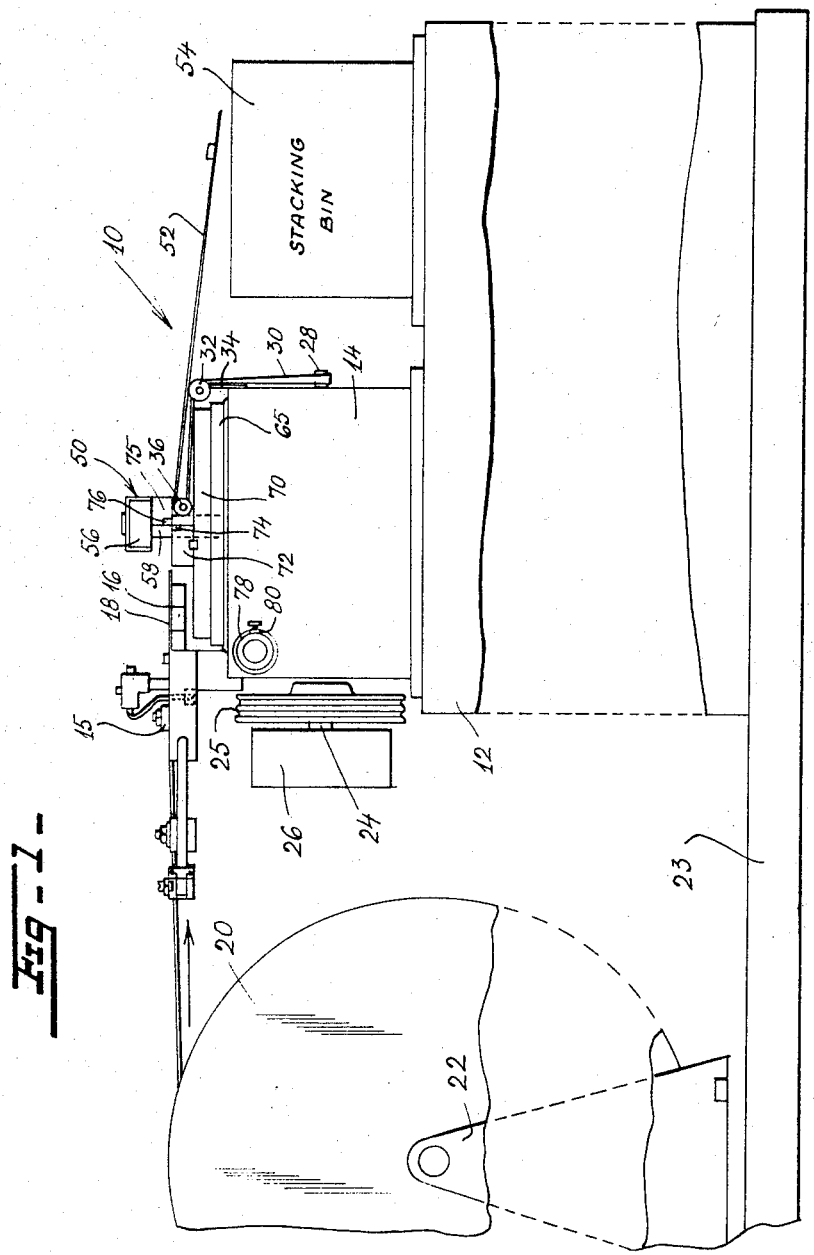

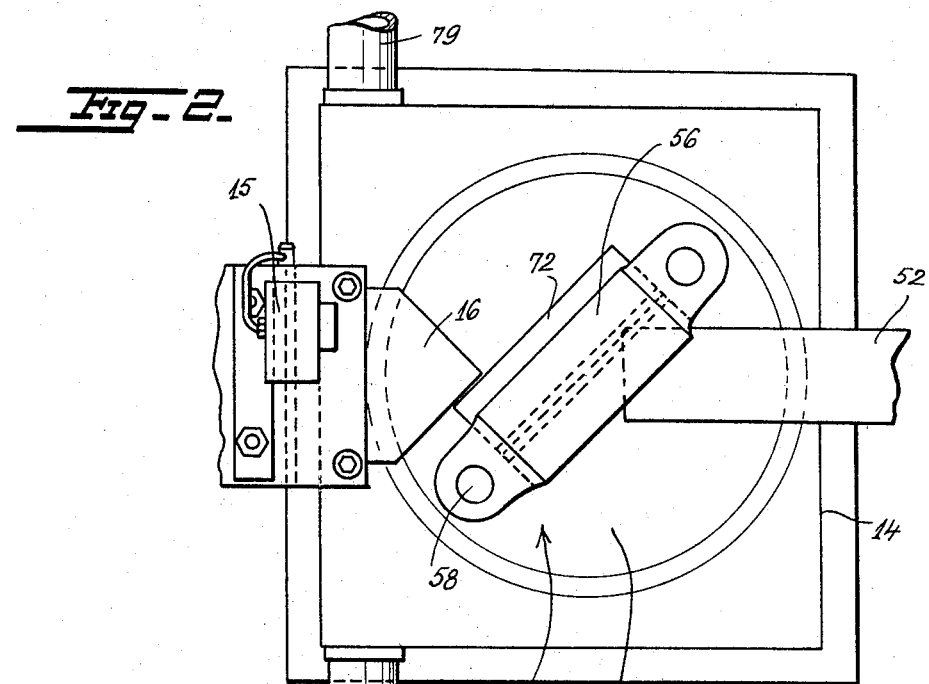
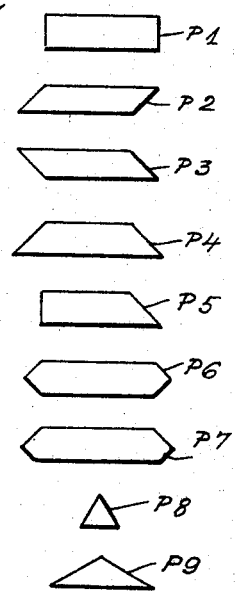
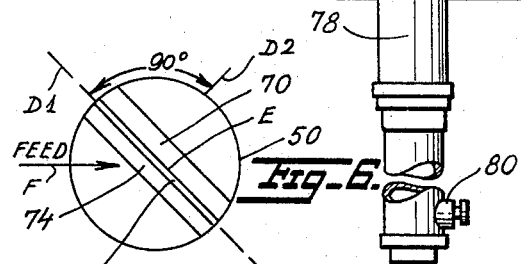
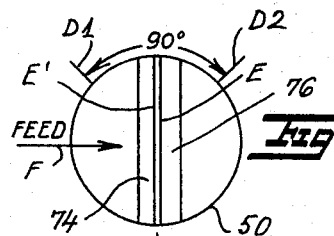
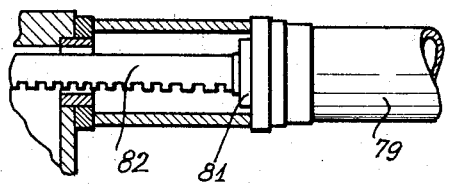
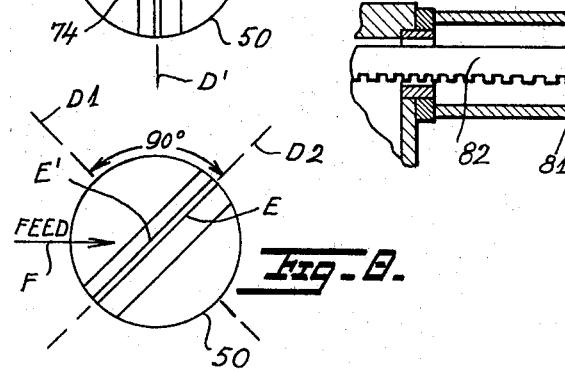
INVENTOR
Harry E. Scribner
BY United States Patent Office 3,440,910
Patented Apr. 29, 1969

ABSTRACT OF THE DISCLOSURE

The disclosure describes a universal shear for cutting, shearing and shaping sheet material in any one of a variety of geometric shapes. It includes an upper tool block which moves up and down against a lower tool block. Both the tool blocks are rotatably adjustable for cutting the material in selected shapes.

---

The invention relates to the art of machine tools and more particularly concerns a machine in which sheet stock can be fed from a roll into a shear head including upper and lower tool blocks. The upper block is carried by a yoke movable up and down in a cyclical sequence. Tangentially disposed mechanical means are provided for adjustably rotating the head through an angle in the range from 0° to 180° to dispose the tool blocks for cutting the sheet stock at any desired angle.

For further comprehension of the invention, and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a side view of a machine embodying the invention.

FIG. 2 is a top plan view of the machine, parts being omitted.

FIG. 5 is an enlarged plan view partially in section of part of FIG. 2, showing portions of a power cylinder and associated rack gear.

FIGS. 6 and 7, and 8 are diagrams illustrating modes of operation of the shear head, and FIG. 9 is a plan view of several pieces having different shapes which the machine is capable of forming.

Figure 3:
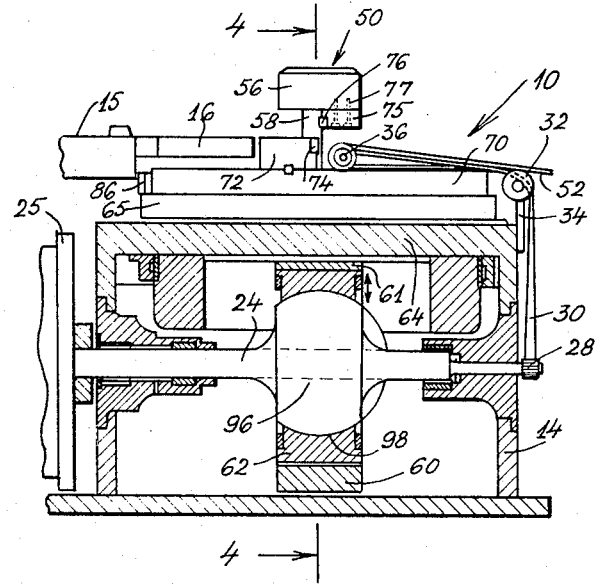
FIG. 3 is an enlarged vertical sectional view taken longitudinally of the machine.
Figure 4:
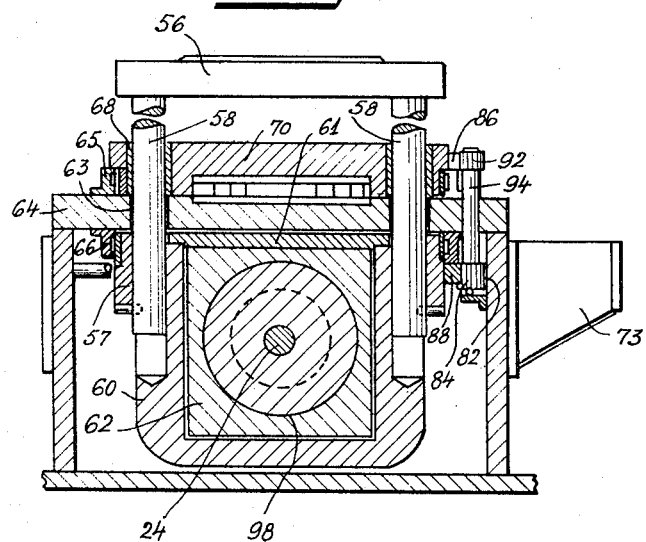
FIG. 4 is a vertical sectional view taken on line 4—4 of FIG. 3.

Referring first to FIGS. 1–5, there is shown a machine 10 mounted on an elevated stand 12. The machine has a rectangular casing 14 mounted on the stand. Supported by the casing is a pneumatically driven sheet feeding assembly 15 of conventional construction terminating in a flat horizontal tapered guide and support 16 for sheet stock 18. The sheet stock is shown carried by a rotatable reel 20 mounted on a stand 22. The stands 12 and 22 are supported on a flat base 23.

A horizontal shaft 24 extends through the casing. The shaft carries at one end a drive pulley 25 operatively connected to a drive motor (not shown). The shaft also carries a flywheel 26. At its other end, shaft 24 carries a pulley 28 on which is entrained a twisted belt 30. This belt passes over an idler roller 32 carried by a bracket 34 attached to casing 14. The belt extends around a roller 36 supported near head 50 of the machine. The belt catches pieces of sheet stock cut off at the head and passes these pieces to an inclined chute 52 which deposits the pieces in a stacking bin 54.

The head 50 of the machine has a horizontal yoke 56 supported by vertical posts or rods 58 slidable in passages 57 in a U-shaped crosshead 60 inside the casing 14. The posts are secured to cap plate 61 of a movable block 62. The posts pass through arcuate slots 63 formed in a stationary cover pltae 64 of the casing. The crosshead 60 carried in bearing races 65 and 66 above and below the cover plate 64 so that the block cap plate 61, block 62 and posts 58 can turn angularly at least 90°, on a vertical axis. The posts pass through bushings 68 set in a circular horizontal bolster plate 70 which rotates with cap plate 61, block 62 and posts 58. Plate 70 is supported rotatably by bearing race 65 on cover plate 64. Mounted on plate 70 is a lower holder 72 of a cutting tool 74; see FIGS. 1 and 3. The tool holder is omitted from FIG. 4. An upper holder 75 for another cutting tool or blade 76 is adjustably supported by the yoke 56. This tool is also omitted from FIG. 4. The two tools 74 and 76 cooperate in cutting the sheet stock. Screws 77 are used to align tool 76 with tool 74.

In order to turn the head 50 on a vertical axis there is provided a pair of cylinders 78, 79 disposed in axial alignment with each other and supported by brackets 73 on the casing 14. These cylinders can be pneumatically operated by compressed air and can be hydraulically operated by oil or other liquid. The cylinders are disposed tangentially to plate 70 and will turn the head 50 in one direction or another depending on which cylinder is actuated. A valve 80 can be provided on each cylinder to control its operation. Each cylinder has a piston 81, best shown in FIG. 5. The pistons are connected to opposite ends of a rack gear 82 and work in opposite directions against each other alternately. The rack gear rotates a pinion 84. Two segment gears 86, 88 are attached to bolster plate 70 and block cap plate 61 respectively. A spur gear 92 is mounted at the top of axially vertical shaft 94 carrying pinion 84. The spur gear 92 is engaged with upper segment gear 86 and pinion 94 is engaged with lower segment gear 88. Thus when the rack gear is moved horizontally in one direction or the other the entire head 50, including crosshead 60, cap plate 61, block 62, posts 58, plate 70 and yoke 56, rotates as a unit on a vertical axis. By operating one cylinder or the other, the rack gear can be moved to adjustably position the head for making cuts at any desired angles in the sheet stock.

Cutting is effected by lowering the yoke carrying the upper tool holder. This is done by an eccentric ball cam 96 carried by shaft 24 and located in spherically curved cavity 98 in block 62. The yoke 56, tool holder 75, cap plate 61, posts 58 and block 62 move up and down as unit as the eccentric ball cam 96 is cyclically rotated on a horizontal axis. As the upper tool 76 intersects the lower tool 74 a piece is cut off from the sheet stock projecting over guide 16.

FIGS. 6–8 show head 50 schematically. Coacting edges E, E' of tools 74, 76 are disposed substantially diametrally of the head. The head can be rotated to turn the cutting edges between positions D1 and D2 spaced angularly 90° apart. FIG. 7 shows the head in a center position D' with edges E, E' transverse to the direction of feed F of the sheet stock. In FIGS. 6 and 8 the head is located 45° counter clockwise and counterclockwise respectively of position D'.

FIG. 9 shows pieces P1–P9 which can be cut by use of the shear head 50. Piece P1 is rectangular. Pieces P2 and P3 are parallelograms. Piece P4 is trapezoid. Piece P5 is a trapezium. Pieces P6 and P7 have double pointed ends. Piece P6 is shorter and narrower than P7. Pieces P8 and P9 are triangular. Other shapes of pieces can readily be made by appropriate angular settings of the head and controlled timing of the vertical stroke of the upper tool holder while the sheet stock is advanced between the tool holders.

It will be noted that while the head 50 is turned angularly on a vertical axis, the eccentric ball cam 96 does not interfere with such rotation although it is held on a fixed horizontal axis. Thus the eccentric ball cam can elevate and lower the upper cutting tool holder in all angular positions of head 50.

Although certain mechanical parts for effecting horizontal and vertical movements of the head 50 have been illustrated in the preferred form of the invention, other equivalent parts could be substituted.

What is claimed is:

1. A universal shear for cutting sheet material, comprising a casing, a block disposed in said casing, said block being rotatable on a vertical axis and movable vertically in the casing, a generally U-shaped crosshead in the casing, a cap plate on the block, a pair of vertical posts slidably mounted in the crosshead, engaged with said cap plate and extending upwardly out of the casing, a yoke carried by the posts for supporting a holder of a first cutting tool, a bolster plate for supporting another holder of a second cutting tool, bearing means rotatably supporting the bolster plate on the casing and rotatably supporting the crosshead in the casing, said posts extending through said bolster plate, means for turning the crosshead, block, cap plate, posts, bolster plate and yoke as a unit on a vertical axis for selectively positioning the cutting tools, and means for raising and lowering the block, cap plate, posts and yoke as a unit to effect cutting the sheet material by the cutting tools.

2. A universal shear as recited in claim 1, wherein the means for turning the block comprises first axially vertical gear members carried by the crosshead and bolster, second axially vertical gear members carried by the casing and engaged with the first gear members, a horizontal rack gear operatively engaged with the second gear members to turn the same, and a pair of cylinders having pistons engaged with opposite ends of said rack gear for reciprocating the same, whereby the block turns on a vertical axis when the rack gear is moved longitudinally.

3. A universal shear as recited in claim 1, wherein the means for raising and lowering the block comprises a horizontal driven shaft extending axially through the casing, a ball cam eccentrically mounted on said shaft, said block having a spherically curved cavity therein, said ball cam being disposed to rotate on a horizontal axis in the said cavity for raising and lowering the said block while permitting free turning of the block on a vertical axis independently of the said ball cam.

4. A universal shear as recited in claim 3, wherein the means for turning the block comprises first axially vertical gear members carried by the crosshead and bolster, second axially vertical gear members carried by the casing and engaged with the first gear members, a horizontal rack gear operatively engaged with the second gear members to turn the same, and a pair of cylinders having pistons engaged with opposite ends of said rack gear for reciprocating the same, whereby the block turns on a vertical axis when the rack gear is moved longitudinally.

5. A universal shear as recited in claim 3, further comprising a pulley on one end of the shaft outside the casing, a plurality of other pulleys, a belt entrained on said pulley, a plurality of idler rollers, said belt being further entrained on said rollers and disposed to catch pieces of said material cut off by the tools for conveying the pieces to a stacking bin.

6. A universal shear as recited in claim 4, further comprising a pulley on one end of the shaft outside the casing, a plurality of other pulleys, a belt entrained on said pulley, a plurality of idler rollers, said belt being further entrained on said rollers and disposed to catch pieces of said material cut off by the tools for conveying the pieces to a stacking bin.

7. A universal shear as recited in claim 1, further comprising tool holders carried by the yoke and bolster plate respectively, cutting tools carried by the tool holders respectively, and means on one of the tool holders for aligning the tools with each other so that they intersect each other to cut the sheet material.

8. A universal shear as recited in claim 1, further comprising a support for a reel of said sheet material disposed near the casing, a pneumatically operated sheet material feeding assembly disposed on the casing for feeding the sheet material from said reel to the cutting tools, and a horizontal guide and support for the sheet material located on the casing near said bolster plate for supporting a free end of the sheet material while it is being cut by the tools.

9. A universal shear as recited in claim 6, further comprising tool holders carried by the yoke and bolster plate respectively, cutting tools carried by the tool holders respectively, and means on one of the tool holders for aligning the tools with each other so that they intersect each other to cut the sheet material.

10. A universal shear as recited in claim 9, further comprising a support for a reel of said sheet material disposed near the casing, a pneumatically operated sheet material feeding assembly disposed on the casing for feeding the sheet material from said reel to the cutting tools, and a horizontal guide and support for the sheet material located on the casing near said bolster plate for supporting a free end of the sheet material while it is being cut by the tools.

References Cited

UNITED STATES PATENTS 3,122,042   2/1967   Littell et al. _____ 83—556 X

JAMES M. MEISTER, *Primary Examiner.*

U.S. Cl. X.R.

83—556, 559, 637